(12) United States Patent
Harper

(10) Patent No.: US 8,225,605 B1
(45) Date of Patent: Jul. 24, 2012

(54) ENERGY CONVERSION SYSTEM

(76) Inventor: Jack R. Harper, Lake Wales, FL (US)

( * ) Notice: Subject to any disclaimer, the term of this patent is extended or adjusted under 35 U.S.C. 154(b) by 55 days.

(21) Appl. No.: 12/806,581

(22) Filed: Aug. 17, 2010

(51) Int. Cl.
*F03C 1/00* (2006.01)
(52) U.S. Cl. ............................................ 60/496; 60/495
(58) Field of Classification Search ............. 60/495–496
See application file for complete search history.

(56) References Cited

U.S. PATENT DOCUMENTS

| | | | | |
|---|---|---|---|---|
| 3,360,926 | A * | 1/1968 | Parr | 60/496 |
| 3,466,866 | A * | 9/1969 | Eschenfeld | 60/496 |
| 3,934,964 | A * | 1/1976 | Diamond | 415/7 |
| 4,683,720 | A * | 8/1987 | De Shon | 60/496 |
| 5,996,344 | A * | 12/1999 | Frenette et al. | 60/496 |
| 6,644,026 | B2 * | 11/2003 | Shimshi | 60/495 |

* cited by examiner

*Primary Examiner* — Hoang Nguyen

(57) ABSTRACT

A shaft has a horizontal primary axis of rotation and a plurality of offset secondary portions. A bladder is coupled to each secondary portion. Each bladder has an upper end, a lower end and an interior. A positive pressure source and a negative pressure source are provided. Positive tubes couple the positive pressure source with the interior of each bladder for inflation. Negative tubes operatively couple the negative pressure source with the interior of each bladder for deflation. A control assembly is provided. The control assembly sequentially inflates each bladder when rotating upwardly and sequentially deflates each bladder when rotating downwardly. A quantity of water submerges the bladders during their movement.

5 Claims, 5 Drawing Sheets

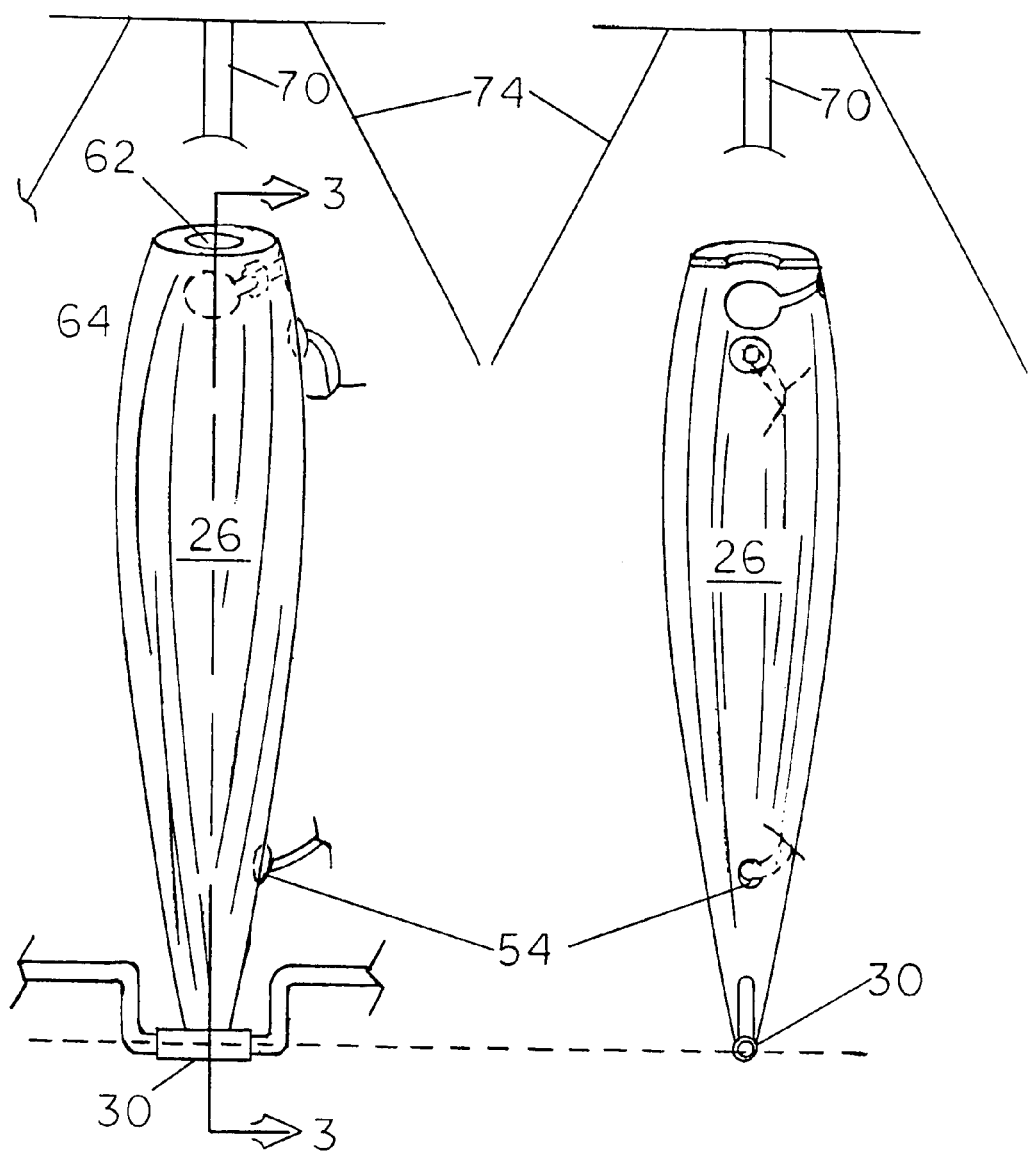

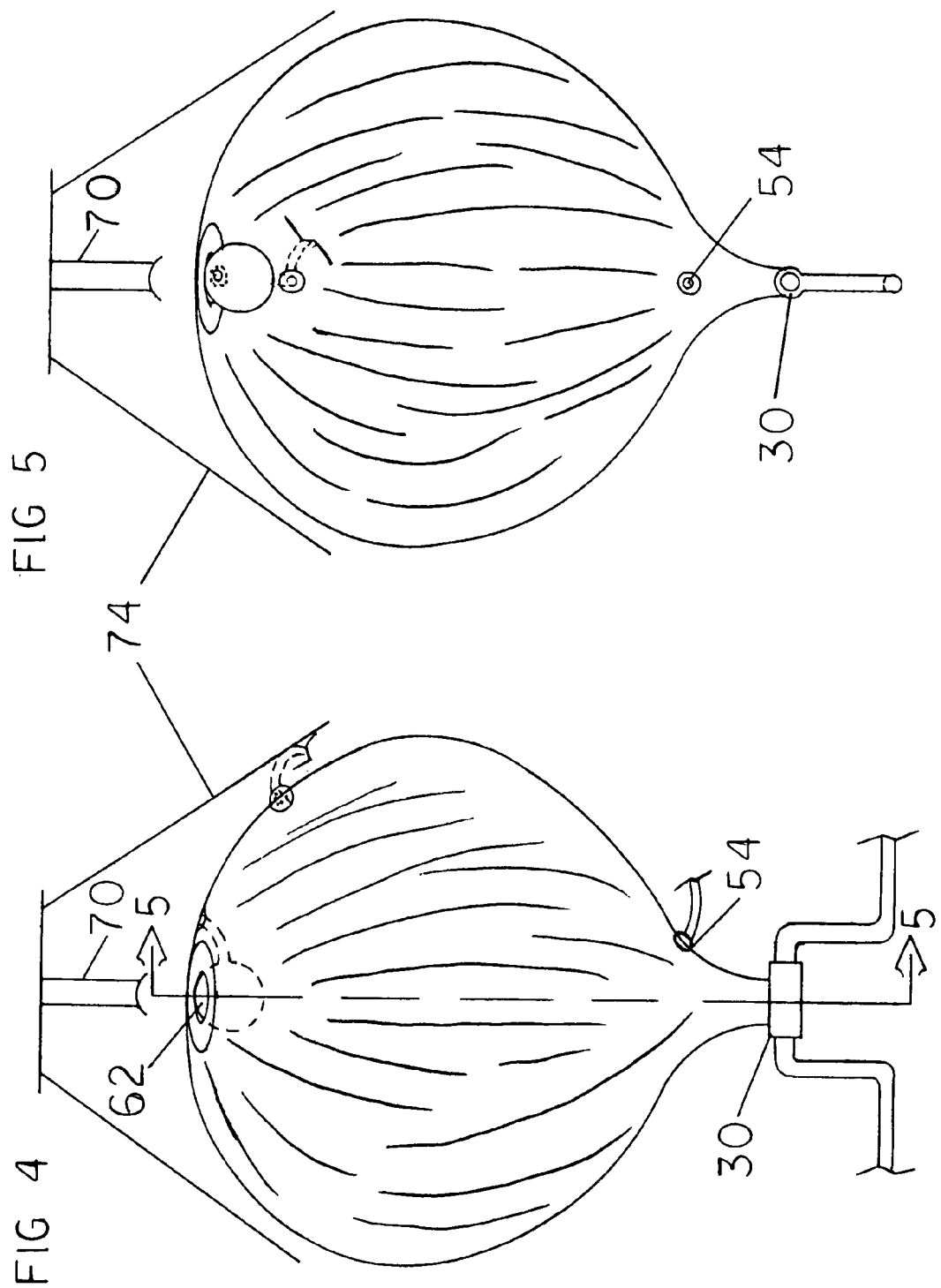

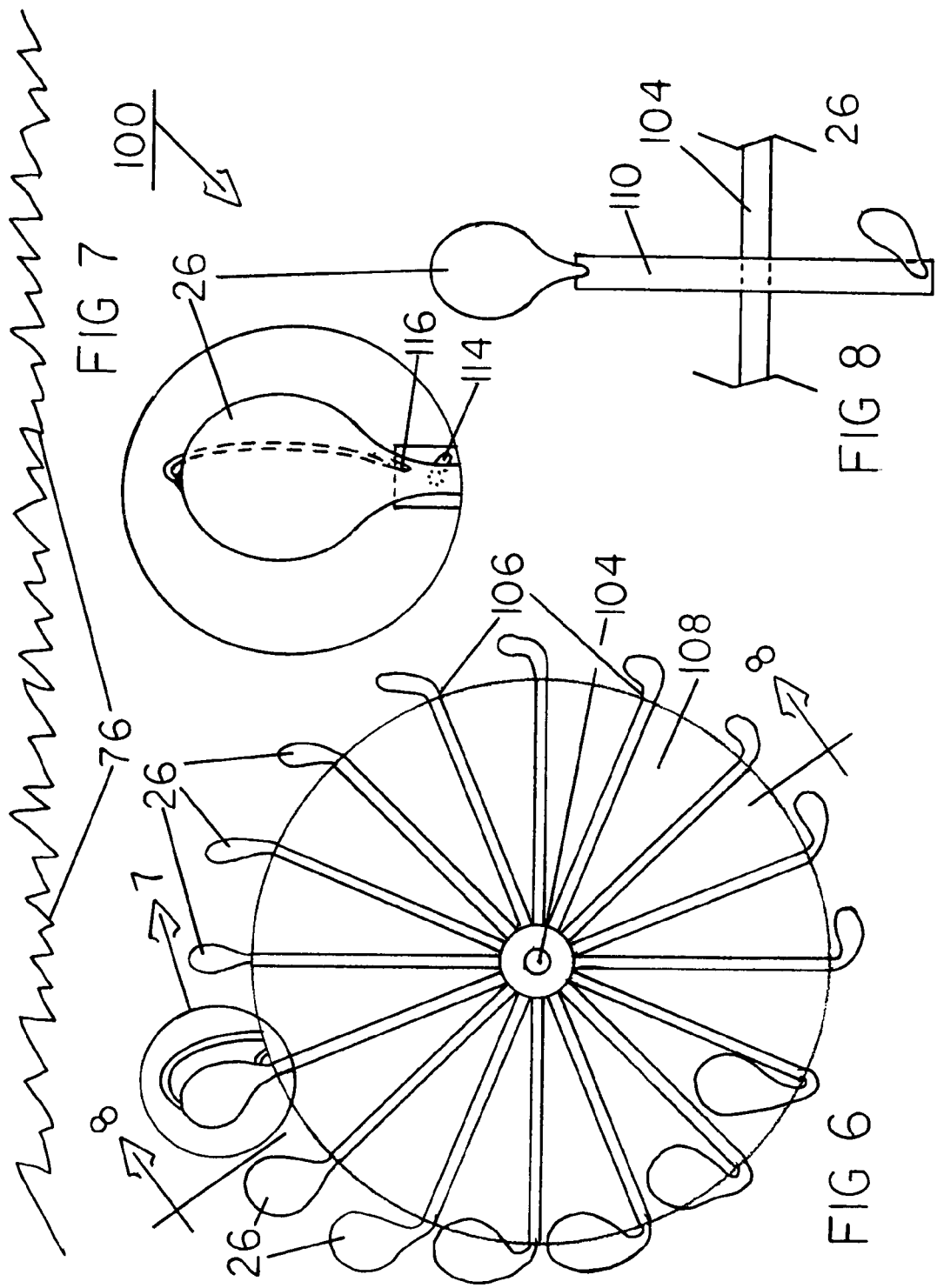

ENERGY CONVERSION SYSTEM

BACKGROUND OF THE INVENTION

Field of the Invention

The present invention relates to an energy conversion system and more particularly pertains to receiving pneumatic energy and generating electrical energy while utilizing the buoyancy of fluids in a safe, highly efficient and economical manner.

SUMMARY OF THE INVENTION

In view of the disadvantages inherent in the known types of energy systems of known designs and configurations now present in the prior art, the present invention provides an improved energy conversion system. As such, the general purpose of the present invention, which will be described subsequently in greater detail, is to provide a new and improved energy conversion system and method which has all the advantages of the prior art and none of the disadvantages.

To attain this, the present invention essentially comprises an energy conversion system. First provided is a crank shaft. The crank shaft has a discontinuous cylindrical primary portion. The primary portion has a horizontal primary axis of rotation. The crank shaft also has first and second diametrically opposed cylindrical secondary portions. The secondary portions have horizontal secondary axes. The secondary axes are laterally offset a common distance from the primary portion. A plurality of bearings are provided. The bearings support the primary portion. In this manner rotational movement is allowed around the primary axis. The first and second secondary portions are adapted to rotate in a cylindrical path of travel around the primary axis.

A first bladder is provided. A similarly configured second bladder is also provided. Each bladder has an upper end. Each bladder has a lower end. Each bladder further has an interior. The interior is adapted to receive pressurized air. In this manner the bladder may be inflated. A first cylindrical collar is provided. The first cylindrical collar couples the lower end of the first bladder to the first secondary portion. A second cylindrical collar is also provided. The second cylindrical collar couples the lower end of the second bladder to the second secondary portion.

Provided next is a source of pneumatic positive pressure. A source of pneumatic negative pressure is also provided.

A first positive tube is provided next. The first positive tube operatively couples the source of positive pressure with the interior of the first bladder adjacent to its lower end. A second positive tube is also provided. The second positive tube operatively couples the source of positive pressure with the interior of the second bladder adjacent to its lower end.

A first negative tube is provided. The first negative tube operatively couples the source of negative pressure with the interior of the first bladder adjacent to its upper end. A second negative tube is also provided. The second negative tube operatively couples the source of negative pressure with the interior of the second bladder adjacent to its upper end.

Also provided is a control assembly. The control assembly includes a first positive valve. The first positive valve is provided in the first positive tube. The control assembly includes a second positive valve. The second positive valve is provided in the second positive tube. The control assembly also includes a first negative valve. The first negative valve is provided in the first negative tube. The control assembly includes a second negative valve. The second negative valve is provided in the second negative tube. The control assembly also includes a timing component. The timing component is adapted to rotate the secondary portions and bladders in a path of travel downwardly from a 12 o'clock position to a 3 o'clock position to a 6 o'clock position. The secondary portions and bladders are further rotated upwardly from the 6 o'clock position to a 9 o'clock position and to the 12 o'clock position in a continuing cycle of operation. The timing component is adapted to sequentially open each positive valve when moving upwardly between the 6 and 12 o'clock positions. The timing component is also adapted to sequentially open each negative valve when moving downwardly between the 12 and 6 o'clock positions.

Further provided is a first aperture. A first flapper valve is provided. The first aperture and first flapper valve are provided in the upper end of the first bladder. A second aperture is provided. A second flapper valve is provided. The second aperture and second flapper valve are provided in the upper end of the second bladder. A first plunger is provided. The first plunger is fixedly positioned to open the first aperture as the first bladder approaches then passes the 12 o'clock position. A second plunger is provided. The second plunger is fixedly positioned to open the second aperture as the second bladder approaches then passes the 12 o'clock position. Conical guides 74 function to direct the upward extent of each bladder to a plunger.

Provided last is a quantity of water. In this manner the bladders are submerged during their movement. Further in this manner movement of the bladders due to the buoyancy of the inflated bladders in the quantity of water is facilitated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved energy conversion system which has all of the advantages of the prior art energy systems of known designs and configurations and none of the disadvantages.

It is another object of the present invention to provide a new and improved energy conversion system which may be easily and efficiently manufactured and marketed.

It is further object of the present invention to provide a new and improved energy conversion system which is of durable and reliable constructions.

An even further object of the present invention is to provide a new and improved energy conversion system which is susceptible of a low cost of manufacture with regard to both materials and labor, and which accordingly is then susceptible of low prices of sale to the consuming public, thereby making such energy conversion system economically available to the buying public.

Even still another object of the present invention is to provide an energy conversion system for receiving pneumatic energy and generating electrical energy while utilizing the buoyancy of fluids in a safe, highly efficient and economical manner.

Lastly, it is an object of the present invention to provide a new and improved energy conversion system. A shaft has a horizontal primary axis of rotation and a plurality of offset secondary portions. A bladder is coupled to each secondary portion. Each bladder has an upper end, a lower end and an interior. A positive pressure source and a negative pressure source are provided. Positive tubes couple the positive pressure source with the interior of each bladder for inflation. Negative tubes operatively couple the negative pressure source with the interior of each bladder for deflation. A control assembly is provided. The control assembly sequentially inflates each bladder when rotating upwardly and sequentially deflates each bladder when rotating downwardly. A quantity of water submerges the bladders during their movement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of one bladder when deflated and in the lowered orientation.

FIG. 3 is a front elevational view, partly in section, of the bladder of FIG. 2.

FIG. 4 is a side elevational view of one bladder when inflated and in the raised orientation.

FIG. 5 is a front elevational view, partly in section, of the bladder of FIG. 4.

FIG. 6 is a side elevational view of an energy conversion system constructed in accordance with the an alternate embodiment of the present invention.

FIG. 7 is an enlarged showing of an inflated bladder taken at circle 7 of FIG. 6.

FIG. 8 is a cross sectional view taken along line 8-8 of FIG. 6.

The same reference numerals refer to the same parts throughout the various Figures for the primary and alternate embodiments of the invention.

DESCRIPTION OF THE PREFERRED EMBODIMENT

Figure 1:
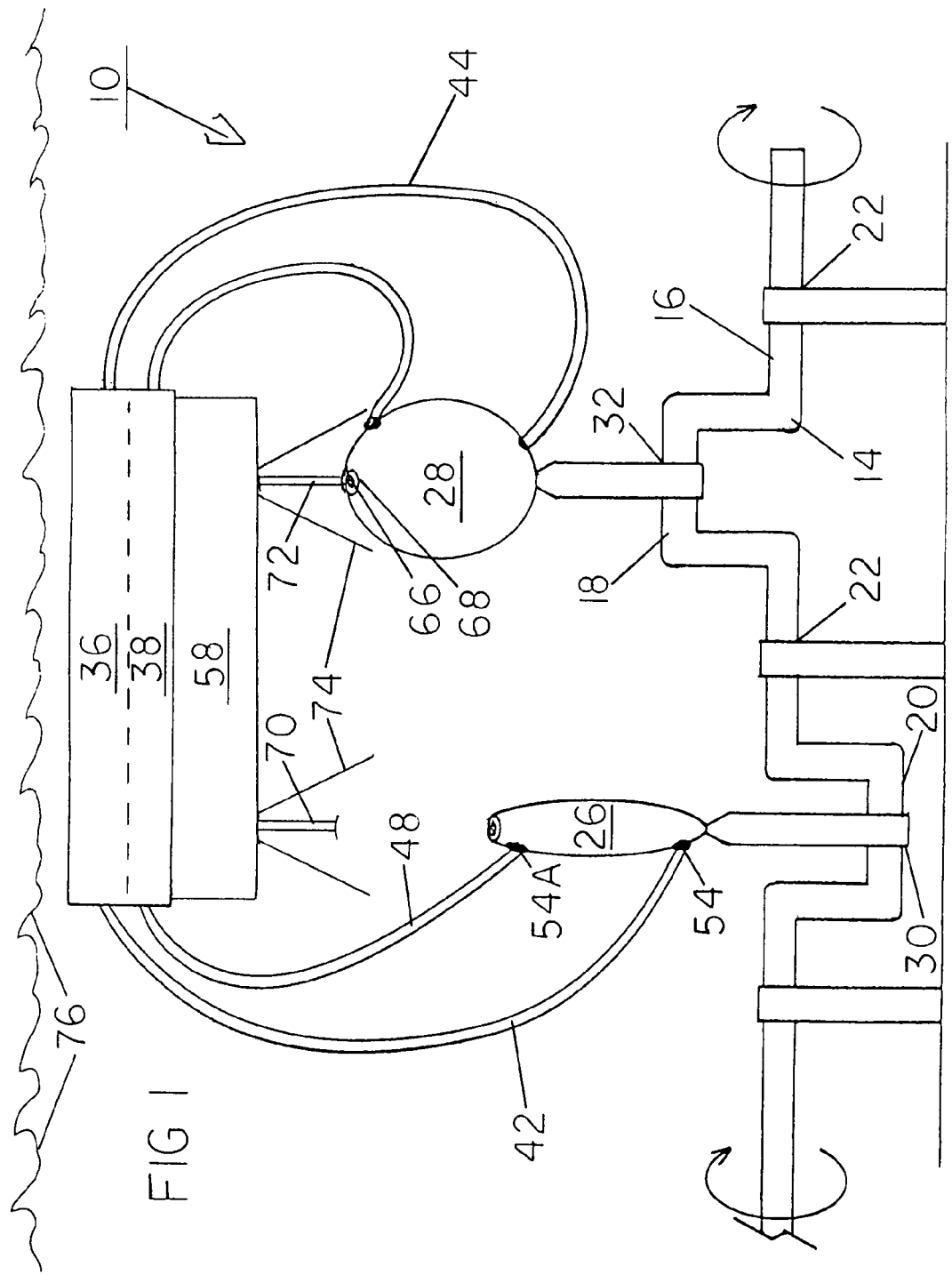
FIG. 1 is a side elevational view of an energy conversion system constructed in accordance with the principles of the present invention.

With reference now to the drawings, and in particular to FIG. 1 thereof, the preferred embodiment of the new and improved energy conversion system embodying the principles and concepts of the present invention and generally designated by the reference numeral 10 will be described.

The present invention, the energy conversion system 10 is comprised of a plurality of components. Such components in their broadest context include a shaft, a bladder, pressure sources, a control assembly and a quantity of water. Such components are individually configured and correlated with respect to each other so as to attain the desired objective.

First provided is a crank shaft 14. The crank shaft has a discontinuous cylindrical primary portion 16. The primary portion has a horizontal primary axis of rotation. The crank shaft also has first and second diametrically opposed cylindrical secondary portions 18, 20. The secondary portions have horizontal secondary axes. The secondary axes are laterally offset a common distance from the primary portion. A plurality of bearings 22 are provided. The bearings support the primary portion. In this manner rotational movement is allowed around the primary axis. The first and second secondary portions are adapted to rotate in a cylindrical path of travel around the primary axis.

A first bladder 26 is provided. A similarly configured second bladder 28 is also provided. Each bladder has an upper end. Each bladder has a lower end. Each bladder further has an interior. The interior is adapted to receive pressurized air. In this manner the bladder may be inflated. A first cylindrical collar 30 is provided. The first cylindrical collar couples the lower end of the first bladder to the first secondary portion. A second cylindrical collar 32 is also provided. The second cylindrical collar couples the lower end of the second bladder to the second secondary portion.

Provided next is a source of pneumatic positive pressure 36. A source of pneumatic negative pressure 38 is also provided.

A first positive tube 42 is provided next. The first positive tube operatively couples the source of positive pressure with the interior of the first bladder adjacent to its lower end. A second positive tube 44 is also provided. The second positive tube operatively couples the source of positive pressure with the interior of the second bladder adjacent to its lower end.

A first negative tube 48 is provided. The first negative tube operatively couples the source of negative pressure with the interior of the first bladder adjacent to its upper end. A second negative tube 50 is also provided. The second negative tube operatively couples the source of negative pressure with the interior of the second bladder adjacent to its upper end.

Also provided is a control assembly. The control assembly includes a first positive valve 54. The first positive valve is provided in the first positive tube. The control assembly includes a second positive valve 56. The second positive valve is provided in the second positive tube. The control assembly also includes a first negative valve 54A. The first negative valve is provided in the first negative tube. The control assembly includes a second negative valve 56A. The second negative valve is provided in the second negative tube. The control assembly also includes a timing component 58. The timing component is adapted to rotate the secondary portions and bladders in a path of travel downwardly from a 12 o'clock position to a 3 o'clock position to a 6 o'clock position. The secondary portions and bladders are further rotated upwardly from the 6 o'clock position to a 9 o'clock position and to the 12 o'clock position in a continuing cycle of operation. The timing component is adapted to sequentially open each positive valve when moving upwardly between the 6 and 12 o'clock positions. The timing component is also adapted to sequentially open each negative valve when moving downwardly between the 12 and 6 o'clock positions.

Further provided is a first aperture 62. A first flapper valve 64 is provided. The first aperture and first flapper valve are provided in the upper end of the first bladder. A second aperture 66 is provided. A second flapper valve 68 is provided. The second aperture and second flapper valve are provided in the upper end of the second bladder. A first plunger 70 is provided. The first plunger is fixedly positioned to open the first aperture as the first bladder approaches then passes the 12 o'clock position. A second plunger 72 is provided. The second plunger is fixedly positioned to open the second aperture as the second bladder approaches then passes the 12 o'clock position. Conical guides 74 function to direct the upward extent of each bladder to a plunger.

Provided last is a quantity of water 76. In this manner the bladders are submerged during their movement. Further in this manner movement of the bladders due to the buoyancy of the inflated bladders in the quantity of water is facilitated.

Reference is now made to the alternate embodiment 100 of the invention illustrated in FIGS. 6 through 8. A shaft 104 is provided. The shaft is continuous and cylindrical and functions to rotate the bladders and to deliver pressurized air to the bladders. The shaft has a horizontal primary axis of rotation. Secondary portions 106 are provided. The secondary portions are provided on a vertical plate 108 oriented in a plane perpendicular to the primary axis. The positive tubes include a radial tube 110 for each bladder. The positive tubes also include an axial tube 112 feeding radial tube. The control assembly includes a pressure sensor 114. The control assembly also includes a valve 116 for each tube. In this manner the bladders may be inflated and deflated as the shaft is rotated.

Figure 9:
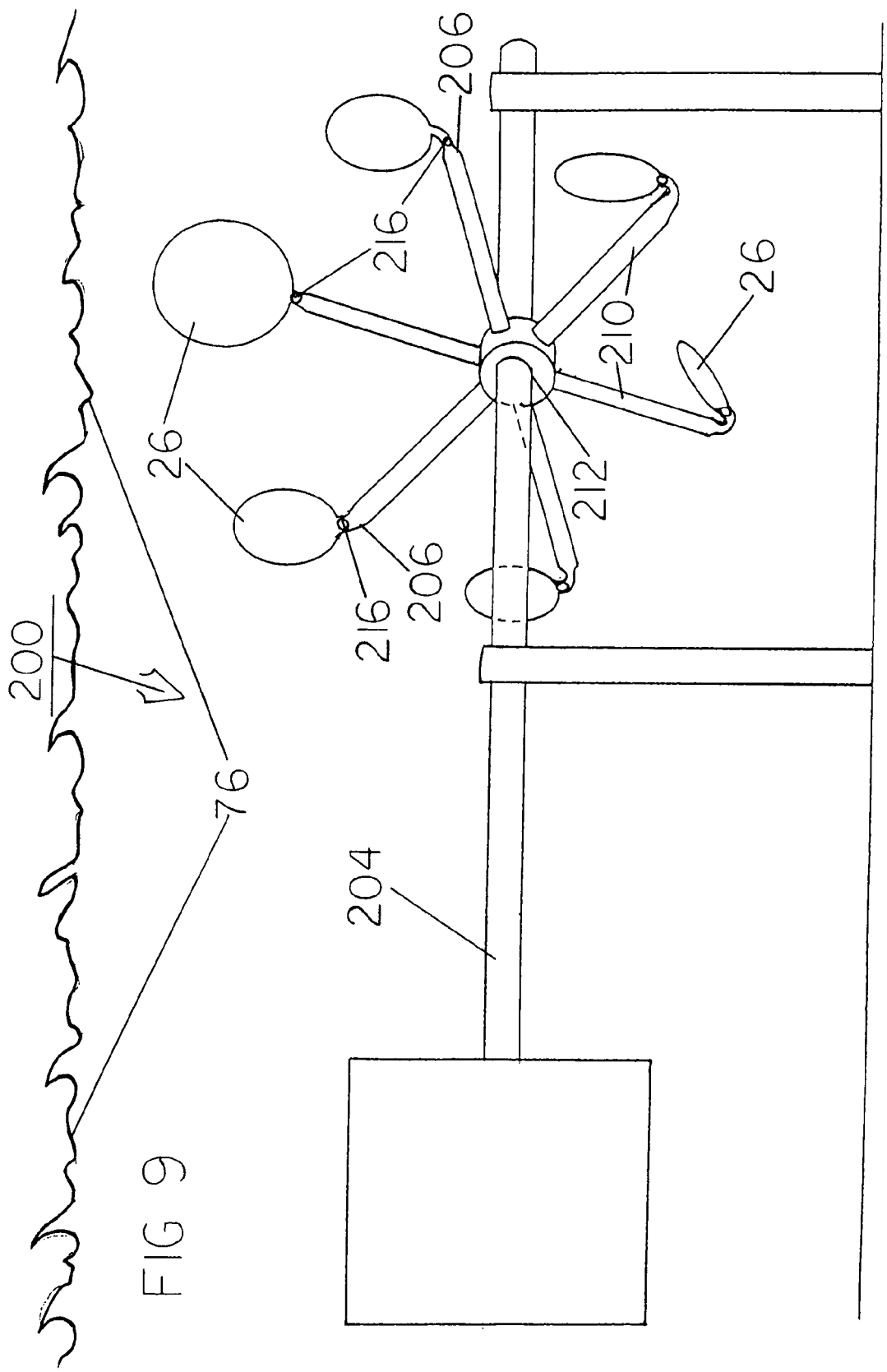
FIG. 9 is a side elevational view of an energy conversion system constructed in accordance with the final alternate embodiment of the present invention.

Reference is now made to the final alternate embodiment 200 of the invention illustrated in FIG. 9. A shaft 204 is provided. The shaft is continuous and cylindrical and functions to rotate the bladders and to deliver pressurized air to the bladders. The shaft has a horizontal primary axis of rotation. Secondary portions 206 are provided. The secondary portions are provided wherein the secondary portions 206 are in a vertical plane perpendicular to the primary axis. The positive tubes include a radial tube 210 for each bladder. The shaft 212 feed the pressurized air to the radial tube and the bladders. Lastly, and a valve 216 for each tube to inflate and deflate the bladders.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An energy conversion system comprising:
   a shaft with a horizontal primary axis of rotation and a plurality of offset secondary portions;
   a bladder coupled to each secondary portion, each bladder having an upper end and a lower end and an interior;
   a positive pressure source and a negative pressure source;
   positive tubes coupling the positive pressure source with the interior of each bladder for inflation, negative tubes operatively coupling the negative pressure source with the interior of each bladder for deflation;
   a control assembly for sequentially inflating each bladder when rotating upwardly and for sequentially deflating each bladder when rotating downwardly; and
   a quantity of water submerging the bladders during their movement; and
   wherein the shaft has a discontinuous cylindrical primary portion with a horizontal axis of rotation, the shaft also having first and second diametrically opposed cylindrical secondary portions with horizontal secondary axes laterally offset a common distance from the primary portion, a plurality of bearings supporting the primary portion for rotational movement around the primary axis while the first and second secondary portions are adapted to rotate in a cylindrical path of travel around the primary axis.

2. The system as set forth in claim 1 wherein the control assembly includes valves in the tubes and a timer associated with the shaft to open and close the valves.

3. The system as set forth in claim 1 wherein the control assembly includes valves in the tubes and pressure sensors to open and close the valves.

4. An energy conversion system comprising:
   a shaft with a horizontal primary axis of rotation and a plurality of offset secondary portions;
   a bladder coupled to each secondary portion, each bladder having an upper end and a lower end and an interior;
   a positive pressure source and a negative pressure source;
   positive tubes coupling the positive pressure source with the interior of each bladder for inflation, negative tubes operatively coupling the negative pressure source with the interior of each bladder for deflation;
   a control assembly for sequentially inflating each bladder when rotating upwardly and for sequentially deflating each bladder when rotating downwardly; and
   a quantity of water submerging the bladders during their movement; and
   wherein the shaft (104) is continuous and cylindrical, the shaft functioning to rotate the bladders and deliver pressurized air to the bladders, the shaft having a horizontal primary axis of rotation, and the secondary portions (106) are on a vertical plate (108) located in a plane perpendicular to the primary axis, the wherein the positive tubes include a radial tube (110) for each bladder and the shaft for feeding radial tubes, and lastly, the control assembly including a pressure sensor (114) and a valve (116) for each tube to inflate and deflate the bladders for rotating the shaft.

5. An energy conversion system (10) for receiving pneumatic energy and generating electrical energy while utilizing the buoyancy of fluids the system comprising, in combination:

a crank shaft (14) having a discontinuous cylindrical primary portion (16) with a horizontal primary axis of rotation, the crank shaft also having, first and second diametrically opposed cylindrical secondary portions (18), (20) with horizontal secondary axes laterally offset a common distance from the primary portion, a plurality of bearings (22) supporting the primary portion for rotational movement around the primary axis while the first and second secondary portions are adapted to rotate in a cylindrical path of travel around the primary axis;

a first bladder (26) and a similarly configured second bladder (28), each bladder having an upper end and a lower end and an interior adapted to receive pressurized air for inflation purposes, a first cylindrical collar (30) coupling the lower end of the first bladder to the first secondary portion, a second cylindrical collar (32) coupling the lower end of the second bladder to the second secondary portion;

a source of pneumatic positive pressure (36) and a source of pneumatic negative pressure (38);

a first positive tube (42) operatively coupling the source of positive pressure with the interior of the first bladder adjacent to its lower end, a second positive tube (44) operatively coupling the source of positive pressure with the interior of the second bladder adjacent to its lower end;

a first negative tube (48) operatively coupling the source of negative pressure with the interior of the first bladder adjacent to its upper end, a second negative tube (50) operatively coupling the source of negative pressure with the interior of the second bladder adjacent to its upper end;

a control assembly including a first positive valve (54) in the first positive tube and a second positive valve (56) in the second positive tube, the control assembly also including a first negative valve (56) in the first negative tube and a second negative valve (56A) in the second negative tube, the control assembly also including a timing component 58 adapted to rotate the secondary portions and bladders in a path of travel downwardly from a 12 o'clock position to a 3 o'clock position to a 6 o'clock position and then upwardly from the 6 o'clock position to a 9 o'clock position and to the 12 o'clock position in a continuing cycle of operation, the timing component adapted to sequentially open each positive valve when moving upwardly between the 6 and 12 o'clock positions, the timing component also adapted to sequentially open each negative valve when moving downwardly between the 12 and 6 o'clock positions;

a first aperture (62) and a first flapper valve (64) in the upper end of the first bladder, a second aperture (66) and a second flapper valve (68) in the upper end of the second bladder, a first plunger (70) fixedly positioned to open the first aperture as the first bladder approaches then passes the 12 o'clock position, a second plunger (72) fixedly positioned to open the second aperture as the second bladder approaches then passes the 12 o'clock position, conical guides 74 to direct the upward extent of each bladder to a plunger; and a quantity of water (76) submerging the bladders during their movement to facilitate the movement of the bladders due to the buoyancy of the inflated bladders in the quantity of water.

\* \* \* \* \*